F. H. BRUNIG.
PNEUMATIC TIRE TROUBLE INDICATOR.
APPLICATION FILED AUG. 29, 1913.
1,096,526.
Patented May 12, 1914.
2 SHEETS—SHEET 1.
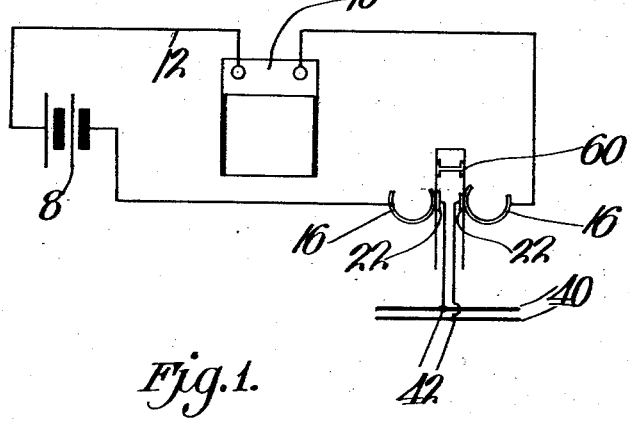
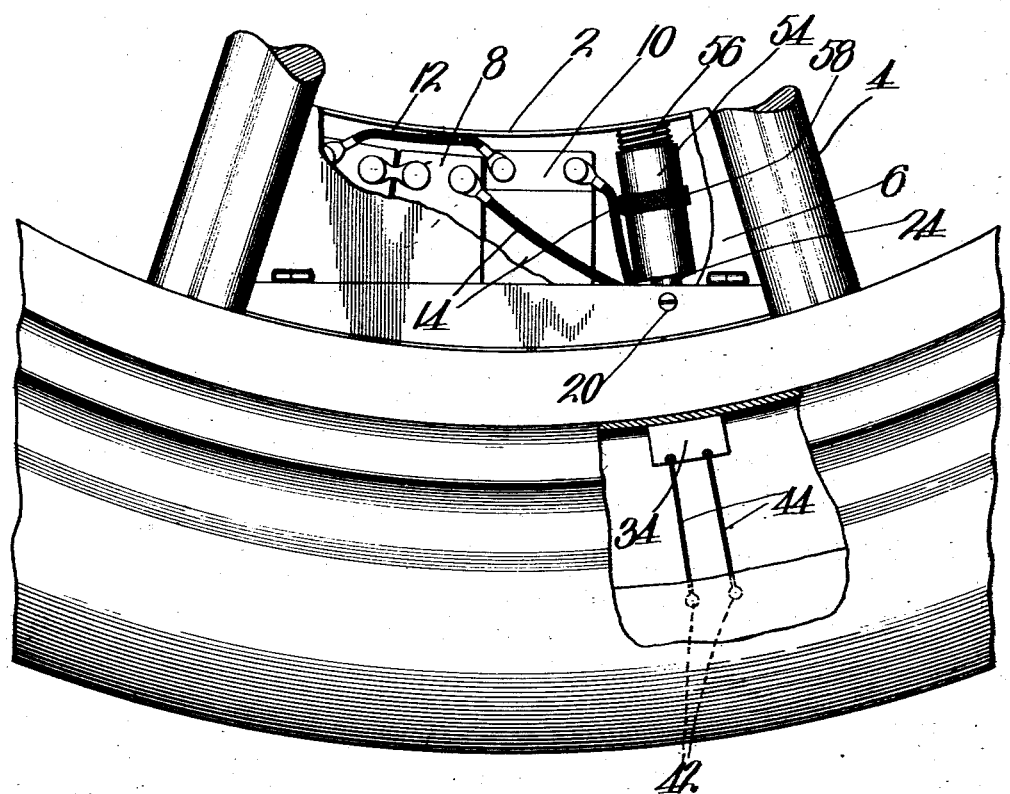
Witnesses
Frank R Glow
Chas W Grand
Inventor
F. H. Brunig
By George F Thorpe Atty.

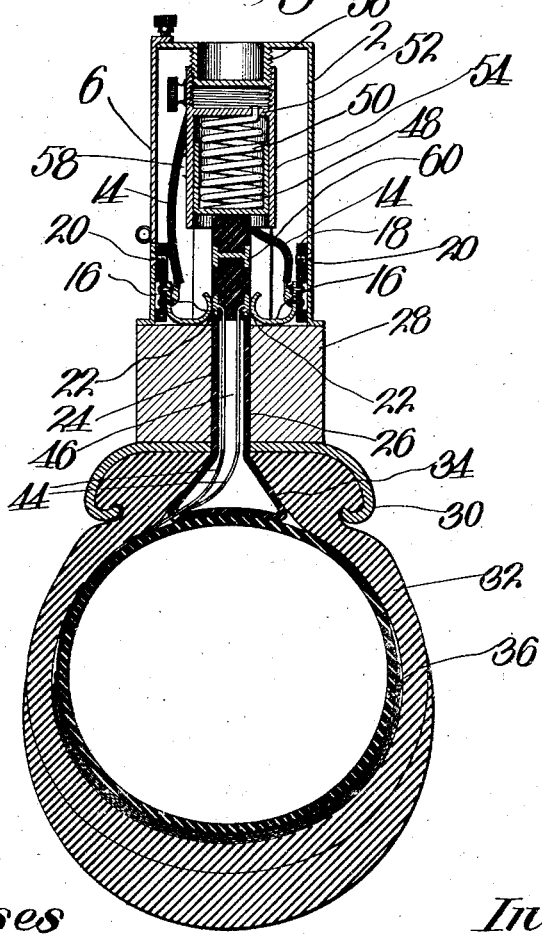

UNITED STATES PATENT OFFICE.

FREDERICK H. BRUNIG, OF KANSAS CITY, MISSOURI.

PNEUMATIC-TIRE-TROUBLE INDICATOR.

1,096,526.　　　　　Specification of Letters Patent.　　Patented May 12, 1914.

Application filed August 29, 1913. Serial No. 787,358.

*To all whom it may concern:*

Be it known that I, FREDERICK H. BRUNIG, a citizen of the United States, residing at Kansas City, in the county of Jackson and State of Missouri, have invented certain new and useful Improvements in Pneumatic-Tire-Trouble Indicators, of which the following is a specification.

This invention relates to pneumatic-tire trouble indicators, and my object is to devise an electric signaling apparatus adapted to be installed in connection with the tire on the wheel and to sound an alarm the moment a puncture is produced in the tire.

It is a further object to provide a device of this character which will be capable of indicating the condition of the tire, whether or not the same is inflated above a given pressure, by giving an alarm at the instant the tire has become collapsed sufficiently to reduce the pressure below a given point.

With these general objects in view, my invention comprises various novel and peculiar features of construction, all as hereinafter described and particularly pointed out in the appended claims; and to afford a full and clear understanding of the same, reference will be had to the accompanying drawings forming a part of this specification, and in which—

Figure 1 is a side view in elevation of a portion of a wheel having my improvements applied thereto, a portion of the tire and of the housing of my device being broken away to disclose the interior arrangement; Fig. 2 is a section through the tire, rim and felly of the wheel, and also the pressure gage portion of the device. Fig. 3 is an enlarged section through a portion of the tire, showing the disposition of the battery terminals between the tire casings; Fig. 4 is a diagram of the electric circuit.

Referring to the drawings, I provide each of the wheels of the vehicle with a housing 2 located between a pair of adjacent spokes 4, and having a hinged section 6 on its outer face to afford convenient access to the interior. Within the housing are located a battery of cells 8 and a buzzer 10 having the wire connection 12, which battery and buzzer are connected by the insulated wires 14 with a pair of brushes 16 mounted on the insulation blocks 18 secured by the screws 20 to the housing. These brushes are positioned to rest against a pair of contact pieces 22 carried by a rubber plunger 24 slidingly mounted in a bore 26 provided therefor in the felly 28 and rim 30 of the wheel, said bore communicating with the outer casing of the tire, within which the plunger extends and terminates in an enlarged portion 34 adapted to bear against the inner casing 36 of the tire. Between the inner and outer tire casings 36 and 32 is disposed a series of three rubberized fabric layers 38 in the outer or tread half of the tire, and between the middle of said layers and each of the others is a layer of conducting material such as tin-foil 40 or a fine mesh wire. Against these layers 40 respectively of conducting material are brought the terminals 42 of a pair of conducting wires 44 leading to the contact pieces 22, said wires 44 passing between the inner and outer tire casings and through a space 46 provided therefor in the plunger 24.

From the foregoing structure it will be apparent that in case of a puncture caused by a sharp metallic object passing through the entire outer casing and said fabric layers 38, the circuit through the battery and buzzer will be closed due to the connection established between the layers of conducting material 40 interposed between the fabric layers in the path of the instrument causing the puncture. It is also desirable to close the circuit through the buzzer in cases of slow leaks in the tires resulting at length in an unsatisfactory partially collapsed condition of the tires. I accomplish this by the following means: The inner end of the plunger 24 extends into abutting relation with a plunger cup 48 within which is seated one end of a coil spring 50, the other end of which spring is seated against a partition 52 in a cylinder 54 which slidingly receives said plunger cup 48. The inner end of the cylinder is internally threaded to engage an externally threaded boss 56 formed on the inside of the housing, whereby the tension of the spring 50 may be adjusted, a knurled portion 58 being provided on the part 50 to facilitate this adjustment. Connected contacts 60 are provided on opposite sides of the plunger 24, a suitable distance from the contacts 22, to be engaged by the brushes 16 whenever the plunger is moved appreciably outward under the influence of the spring 50. It will be understood that the spring will be set at a tension corresponding to the pressure which it is desired to maintain in the tire, and whenever this tire pressure is reduced on account of leakage, the tension of the spring is relaxed and incidentally moves the plunger outward, with the result that the electric circuit will be closed as soon as the contacts 60 reach the brushes.

Whether the circuit is closed due to a puncture or by the gradual collapse of the tire, it is of course obvious that the alarm given by the buzzer immediately indicates to the driver the condition of the tire, and steps can be taken to remedy the trouble without delay, thereby avoiding the increased damage often resulting from continued riding on a partially flattened tire through failure to discover its injured condition in time.

From the foregoing, it will be clear that I have provided a very simple and effective means for carrying out the objects of my invention, and while I have illustrated the preferred form of the same, it will be obvious that it is susceptible of various modifications. I therefore desire to be understood as reserving the right to all such modifications as properly fall within the scope of the following claims, including the incorporation, if found desirable, of the insulated conductors in the outer tire casing as well as between the layers 38 as shown.

I claim:

1. In an apparatus of the class described, the combination of a tire, insulated layers of conducting material disposed in the tread portion of said tire, and an electric circuit including a signaling device and having conductors terminating in said layers, whereby an instrument piercing said tire and connecting said layers will close the circuit.

2. In an apparatus of the character described, the combination of a wheel provided with a pneumatic tire, an electric circuit including a signaling device, a spring-actuated insulated plunger mounted slidingly in the felly of the wheel and bearing against the inner casing of the tire, said circuit having brushes in sliding contact with said plunger and the latter carrying insulated contacts held in contact with the brushes when the tire is fully distended, conductors connected with said brushes and provided with insulated terminals in the tread portion of the tire in position to be connected by an instrument passing through said tread portion, and a pair of connected contacts carried by said plunger and adapted to be brought in contact with said brushes upon a reduction of the pressure within the tire below a given point.

In testimony whereof I affix my signature, in the presence of two witnesses.

FREDERICK H. BRUNIG.

Witnesses:
   CHAS. W. GERARD,
   G. Y. THORPE.